INVENTOR
HERBERT L. COTTON
BY Cushman, Darby & Cushman
ATTORNEYS

__United States Patent Office__

3,368,255
Patented Feb. 13, 1968

3,368,255
HOLE CUTTING APPARATUS FOR PIPE SECTIONS
Herbert L. Cotton, Uhrichsville, Ohio, assignor to United States Concrete Pipe Company, Pittsburgh, Pa., a company of Pennsylvania
Filed Dec. 1, 1965, Ser. No. 510,835
6 Claims. (Cl. 25—107)

ABSTRACT OF THE DISCLOSURE

An improved apparatus for cutting relatively large holes in uncured, moist, clay pipe sections is disclosed, and the apparatus includes a support arm means which is of a special configuration to be readily inserted into, and removed from, a clay pipe section for supporting the pipe section while a cutter element penetrates a wall portion of the moist pipe section. The support arm may include template depressions for receiving the cutter element, and the angle of cut for the cutter element may be adjustable.

This invention relates to apparatus for cutting holes in pipe and is particularly concerned with cutting holes in clay pipe sections so that branches may be attached to the pipe sections.

In the manufacture of clay pipe sections for use in sewer lines and similar uses, it is necessary to provide for the construction of sections having branches, as well as the more conventional straight sections of pipe. The branched sections usually have a branch line which is smaller in diameter and at an angle to the main line of the larger diameter pipe section. Such branch sections are commonly manufactured with branches in the form of a Y where the branch line is positioned at a 60 degree angle to the main pipe section and in the form of a T where the branch section is attached at a 90 degree angle to the main pipe section.

Prior manufacturing techniques have required the use of hand tools for manually cutting holes in uncured straight pipe sections. The holes are cut and formed by hand at an appropriate angle and in the proper position along the length of a straight pipe section and then a branch section is attached to the main pipe so as to communicate with the main pipe through the hole previously formed. Such techniques for manufacturing branched pipes are necessarily slow and costly, and a high degree of skill is required in the manual cutting and forming of a hole through the pipe body.

The present invention provides for an apparatus which punches or cuts holes through straight pipe sections, and the use of the apparatus assures a more uniform product at a lower cost than has been possible with prior techniques and devices. The apparatus of this invention provides for the automatic positioning of a straight pipe section on a support arm carried by the cutting device, and provision is made for cutting holes for either Y branch connections or T branch connections to the main pipe section. A power operated cutting device is automatically actuated to cut through the main body of the properly positioned pipe section and at the appropriate angle for the ultimate attachment of a branch section to the main section. After the hole is cut and the cutting device has been removed from the main pipe body, the cutting device and its support arm are automatically moved away from the pipe section so that the cut section can be conveyed away for subsequent operations and a new pipe section can be brought into position for cutting. After the pipe sections are cut, the branches are attached in a conventional manner and the entire pipe assembly is then finished and burned to produce the final product.

Other advantages of this invention will become apparent in the detailed discussion which follows and in that discussion reference will be made to the accompanying drawings in which:

FIGURE 3 is a side view of a cutting means for use in making 90 degree angular cuts into a pipe section.

Figure 1:
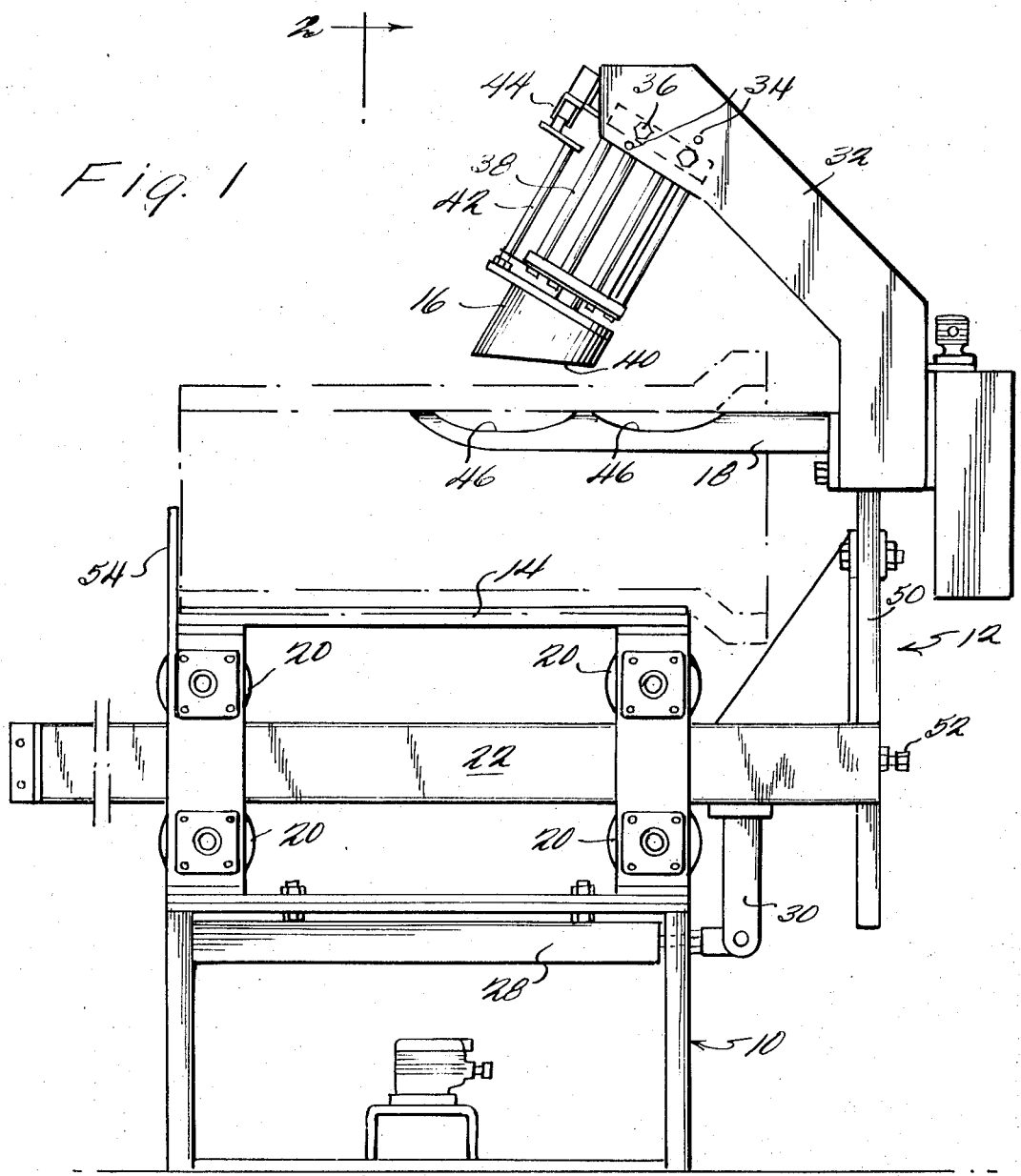
FIGURE 1 is an elevational view of the pipe cutting apparatus and showing a support table for receiving pipe sections.

Referring to FIGURE 1 the pipe cutting apparatus is illustrated as having a fixed base frame portion 10 and a movable frame portion 12 which carries a cutting means associated with the apparatus. The movable frame portion 12 is mounted so as to be horizontally movable relative to the base 10, and the base 10 includes an upper surface or table 14 for supporting and receiving pipe sections which are to be cut. The movable relationship between the two frame sections permits a pipe section to be received on the table 14 while the cutting means is positioned remotely from the pipe section. Then the cutting device can be moved toward the pipe section so as to receive the pipe section on a support arm and template 18 for a cutting action by the cutter 16.

The base frame section 10 is made up of metal framing elements which define a support frame for the entire apparatus and which will carry the weight of the apparatus and the pipe sections for all positions of the cutting device. Roller devices 20 are mounted at two levels of the base frame 10 so as to receive a leg member 22 from the upper movable frame portion 12. As viewed in FIGURE 2, the leg member 22 passes between the upper and lower levels of the roller devices 20 and is thereby supported by the rollers and is easily moved toward and away from the frame 10. Each of the rollers is illustrated as having an inner contacting surface 24 for engaging top or bottom portions of the leg member 22, and a larger diameter portion of the roller provides a face 26 which contacts the sides of the leg member 22 so as to prevent lateral movement of the leg member in its passage through the frame section 10. When the leg member 22 is moved toward and away from the frame section 10, all of the remaining structure of the movable frame portion 12 which is connected to the leg 22 is likewise moved toward and away from the frame section 10. A power operated means 28 is provided for extending and retracting the movable frame portion 12 relative to the base frame section 10, and a suitable power system includes an air operated bellows or other fluid means for extending and retracting the upper frame portion 12. The bellows 28 may be connected through a connecting arm to a downwardly depending linking member 30 for applying extending and retracting movements to the leg member 22 and all of the upper frame portion 12.

Figure 2:
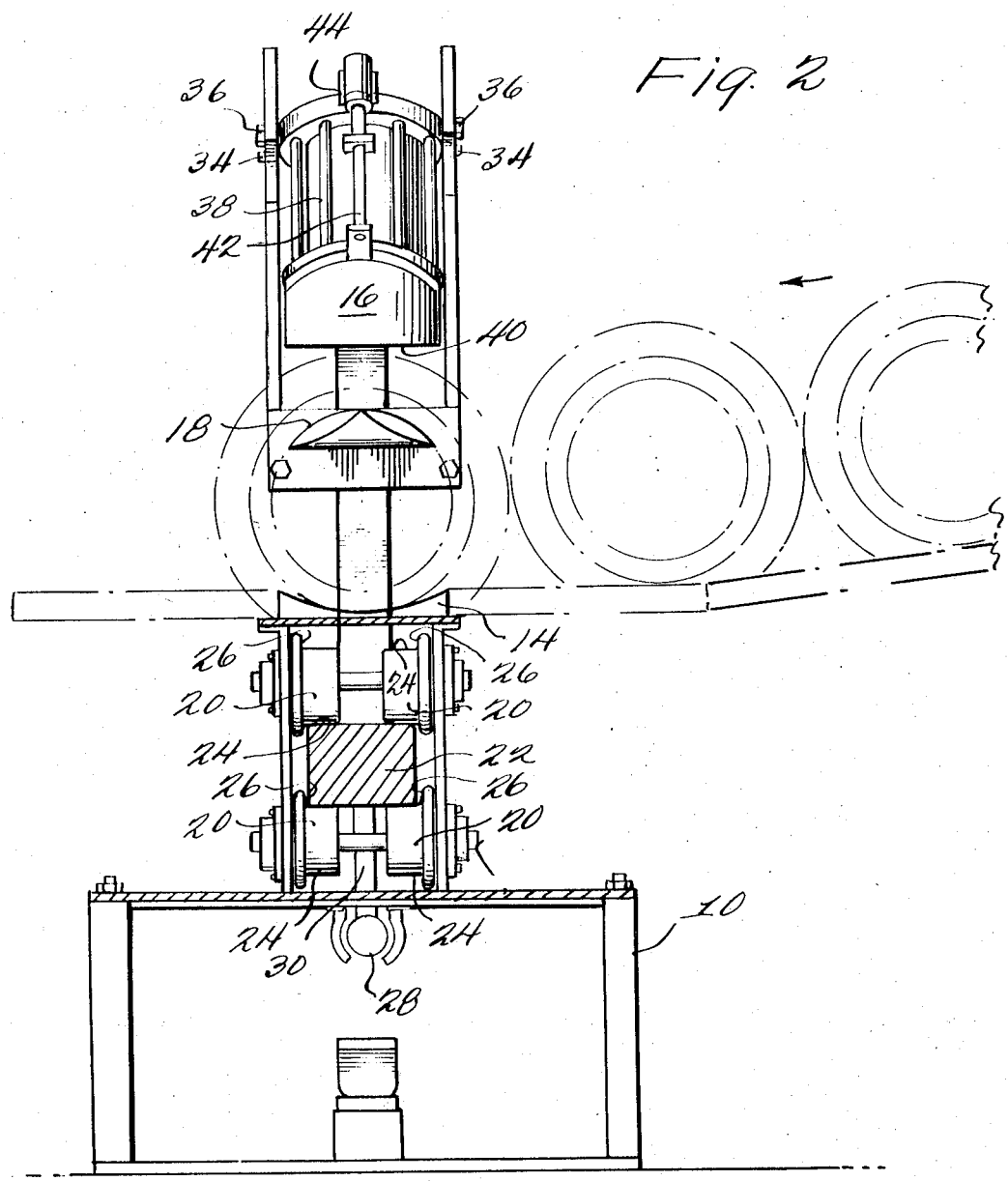
FIGURE 2 is a cross sectional view taken at line 2—2 of FIGURE 1.

The table 14, referred to above, may be in the form of a horizontally flat surface for receiving pipe sections for cutting, but in the preferred form of the invention the table surface is saddle-shaped so as to receive and hold a pipe section in correct alignment for cutting. A conveying means is mounted adjacent the table 14 for conveying, by gravity or otherwise, a series of parallel aligned pipe sections to the table surface. Only one pipe section at a time is received in the concave surface of the table, as illustrated in FIGURE 2. After the pipe section has been cut, the cut pipe section is advanced away from the table, and another pipe section is advanced by the conveying means into the receiving surface of the table 14. The cut pipe section may be advanced away from the table either by lifting the section out manually or the table 14 may be connected to an air or hydraulic cylinder so as to be lifted and tilted to dump the cut pipe section out of it. The air or hydraulic cylinder means is not illustrated, but includes any conventional linkage to lift one side of the table upon actuation. An opposite side of the table can be hinged or pivoted so that the table will be swung around the pivotal axis upon actuation of the cylinder means.

The cutting device, which is carried by the upper movable frame portion 12, is mounted above the pipe support arm 18 so that a cutter 16 can be extended and retracted relative to the supported pipe section which is to be cut. The supporting means for the cutter 16 includes a mounting arm 32 which extends upwardly above and laterally over the support arm template 18 so as to position the cutter in alignment with an upper surface of a pipe section. The mounting arm 32 is attached to the movable frame 12 for movement therewith, and the mounting arm 32 includes positioning means for setting the angle of movement for the cutter 16. In the embodiment illustrated in FIGURE 1, the positioning means are shown in the form of pairs of holes 34 and 36 which are bored through the mounting arm 32 for receiving bolts or other connecting devices to hold the cutter and its actuating assembly in the correct angular position. The pair of holes 34 are spaced apart on a horizontal plane and provide a position that places the cutter and its actuating means on a vertical plane for cutting at a 90 degree angle relative to the surface of a pipe section. On the other hand, the holes 36 are spaced apart on an angular plane which positions the cutter and its actuating means on a 60 degree angle relative to the horizontal surface plane of a pipe section so as to cut a hole at a 60 degree angle through the pipe section. The 90 degree angle of cut is preferred where a T branch is to be attached to the main pipe section and the 60 degree angle is preferred where a Y branch is to be attached to the main pipe section. Of course, it will be obvious that other positions can be provided by placing additional mounting or positioning means at the appropriate angles for attaching the cutter to the support arm 32. The FIGURE 1 embodiment shows the cutter 16 and its actuating means 38 mounted for an angular cut at a 60 degree angle. The mounting holes 36 are utilized for connecting the cutter and its actuating means at the 60 degree angle, and bolt devices are threaded through the holes 36 and into receiving bores at the upper end of the actuating means assembly 38. Similar holes and bolts may be provided on the opposite side of the mounting arm, and also it is contemplated that the bolts may pass all the way through receiving bores in the actuating means assembly 38.

The actuating means assembly 38 is illustrated as including an air operated cylinder 39 as shown in FIGURE 1. The air operated cylinder may be in the form of a bellows type of power cylinder or it may alternatively include some other fluid operated device, such as a hydraulically operated piston and cylinder combination. Conventional connections and controls (not shown) supply a fluid under pressure to the cylinder means 39. The actuating means 38 is constructed to extend and retract the cutter 16 along a cutting axis which is determined by the angle at which the actuating means is mounted on the arm 32, as discussed above. In the mounted position shown in FIGURE 1, the actuating means is mounted to extend and retract the cutter 16 on a cutting axis which is at a 60 degree angle to the top horizontal surface of a pipe section supported over the support arm 18.

The particular shape of cutter utilized depends upon the angle of cut being made, and in the FIGURE 1 construction it can be seen that the cutter 16 is constructed to present a cutting edge 40 which will contact all of the uppermost surface of a pipe during the downward movement of the cutter toward the pipe. FIGURE 3 illustrates a different form of cutter which is used when a cut is being made at a 90 degree cutting axis relative to a pipe section. As with the FIGURE 1 cutter, the alternative cutter of FIGURE 3 provides a cutting edge which maintains a parallel relationship to the uppermost pipe surface while moving downwardly toward the pipe section. The cutter 16 is preferably made in the form of a hollow shell having a circular cross-section. The cutter is open at the cutting end 40 and closed at an opposite end for attachment to a reciprocating portion of the actuating means 39. It has been found that when the outer shell of the cutter is constructed from a thin metal material, a very good cutting action for moist clay pipe results. A typical thickness for the cutting walls of the cutter is ⅛ inch, and this presents a thin cutting edge 40 which may be tapered or sharpened if desired. As the cutting element is moved through the wall of a pipe section, the cutting edge advances through the material of the wall section and a portion of the wall remains within the confines of the cutter shell until the hole is completely cut.

Figure 4:
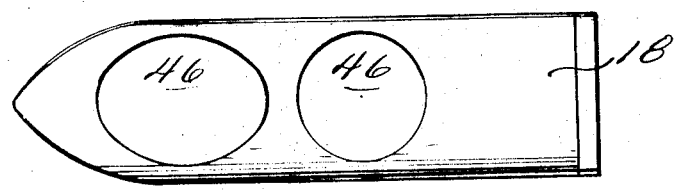
FIGURE 4 is a top plan view of the support arm and template which is carried by apparatus of FIGURE 1.

The support arm means 18 is illustrated further in FIGURE 4 to show its function as a template to aid in a clean cutting action. The upper surface of the support arm 18 includes at least one depression or opening 46 which corresponds to the size and shape of cutter being used. Additional openings may be positioned along the support arm to accommodate the various angles of cut which can be made by adjusting the mounting angle of the cutting device. The support arm itself is finished with a curved upper surface to provide a firm support to the inner surface of a round pipe section placed over the arm, and this assures a cleaner cut with no damage or distortion to areas of the pipe adjoining the hole which is being cut.

In actual practice the pipe cutting apparatus can be used for cutting holes through the side walls of moist, extruded pipe sections having standard barrel diameters of 4, 6, 8, 10, 12, and 15 inches. Additionally, holes can be cut in larger diameter pipes which are molded or pressed, and such larger sizes include barrel diameters of 18, 21, 24, 27, 30, 33 and 36 inches. The diameters of the branches which are ultimately attached are usually smaller than the barrel diameter of the main pipe section to which they are attached.

In operation, pipe sections can be conveyed onto the table portion 14 of the apparatus. When a pipe section is in proper position on the table 14, and in axial alignment with the support arm means 18, an operator can actuate the movable frame portion 12 to retract toward the table and to insert the support arm 18 into the pipe section supported on the table. The means for extending and retracting the bellows 28 includes a source of air under pressure together with conventional switching and valve devices for controlling the flow of air pressure, and such devices may include a foot operated means for actuating the bellows 28 in the desired direction of movement. When the pipe section is in its horizontally disposed position over the support arm, timing devices cause air pressure to operate the bellows in the actuating means 38 so as to extend the cutter 16 downwardly and through a wall of the horizontally supported pipe section. An arm member 42 is carried by a portion of the cutter 16, and when the cutter moves downwardly, an upper end of the arm 42 breaks contact with a micro switch 44. This break in the circuit initiates a timed cycle which determines the retraction for the cutter 16 when it reaches its lowermost cutting position. The cutting means 16 passes entirely through the wall of the clay pipe section, as supported by the support arm 18, and depressions or openings 46 are placed in the support arm 18 to receive the cutting end of the cutter as it passes through the pipe section. Upon automatic retraction of the cutting means 16, the support arm is removed from the pipe section, and the cut pipe is manually removed from the table 14, or the table is tilted to remove the pipe section. Then, the entire line of uncut pipe sections can be moved along to place another section on the table 14 and to present a new pipe section to the support arm for a cutting operation.

After a pipe section has been cut, it is conveyed to another place where a branch or spur can be attached over the hole portion, and then the pipe and branch combination are finished and fired by known methods.

In addition to the features described above, the hole forming apparatus of this invention includes a number of adjustment and control features which permit it to be adjusted to a wide variety of cutting situations. For example, the mounting arm 32 may be carried by an adjustable column section 50 which can be vertically adjusted relative to the leg member 22. An adjustment means 52, in the form of a threaded bolt device, can be used to fix the column 50 in any of its adjustable vertical positions, and alternatively a fluid operated piston and cylinder means can be connected to control the vertical placement of the support arm 18. The interchangeability of cutter means 16 has already been discussed with respect to providing different types of cutters for different angles of cuts. Likewise, larger or smaller diameter cutters may be substituted for any given cutting requirement. Also, a contacting arm or plate 54 may be positioned at one end of the table 14 for limiting the movement of a pipe section on the table when the support arm 18 is being inserted into the pipe section. The contacting arm 54 may be connected to a switching device which stops movement of the movable frame 12 when the end of a pipe strikes the arm 54 with a predetermined force.

Although this invention has been described with reference to a preferred embodiment, it will become apparent that many variations are possible without departing from the inventive concepts. Such variations are intended to be included within the scope of the invention, as described in the following claims.

What is claimed is:

1. Apparatus for cutting holes in pipe sections comprising:
    a base frame means having means for holding a pipe section to be cut,
    a movable frame means mounted for movement relative to said base frame means,
    a support arm carried by said movable frame means for receiving and for supporting a pipe section while it is being cut, said support arm being inserted in a pipe section when said movable frame is moved toward said base frame and removed from a pipe section when said movable frame is moved away from said pipe section,
    a cutting means carried by said movable frame means, said cutting means being carried in a spaced position relative to said support arm for movement toward and away from said support arm, said cutting means being adjustably mounted in said movable frame means for adjusting the cutting axis of said cutting device relative to a pipe section carried by said support arm means, and means for actuating said cutting means toward and away from said support arm, whereby said cutter can be moved through a pipe section supported on said support arm so as to cut a hole through a wall of said pipe section.

2. The apparatus of claim 1 wherein said base frame means includes an upper table means for aligning a pipe section prior to being cut, and including means for moving said support arm toward and away from said table for inserting said support arm in said pipe section for cutting.

3. The apparatus of claim 1 wherein said support arm includes a template means having at least one depression in its pipe engaging surface for receiving said cutting means when the cutting means is moved through said pipe section for cutting the same, and wherein said support arm has a curved pipe engaging surface for supporting the inner surface of a pipe section in the area to be cut.

4. The apparatus of claim 1 wherein said mounting means for adjusting said cutting axis includes positions for setting a cutting axis of 60 degrees and a cutting axis of 90 degrees relative to the surface of a pipe section being cut.

5. Apparatus for cutting relatively large holes through side walls of moist, uncured clay pipe sections, comprising:
    a mounting arm means for carrying a support arm means and a cutting means of said apparatus,
    support arm means extending outwardly from said mounting arm means, said support arm means being disposed in a horizontal plane for supporting a pipe section with its longitudinal axis on a horizontal plane, so that said pipe section can be placed over said support arm means, said support arm means being of such a configuration and dimension that it can be placed through the bore of a pipe section with only an upwardly directed portion of its surface engaging an upper inner surface of said pipe section, said upwardly directed surface portion of said support arm means further including a curved configuration which substantially matches the curved inner surface of said pipe section, and said support arm having at least one opening in its upwardly directed surface for receiving a cutting means when the cutting means is actuated to cut a hole through the wall of a pipe section, and
    a cutting means adjustably mounted on said mounting arm means and carried in a spaced position from said support arm means, said cutting means having a cutting element in the form of a hollow shell having an open cutting end in a shape of the hole to be cut, and actuating means for reciprocating said cutting means toward and away from a pipe section supported on said support arm means, whereby said cutting means can be moved through a wall section of said pipe for cutting a hole through the pipe.

6. The apparatus of claim 5 wherein said cutting means is positioned over said support arm means, and including adjustable positions on said mounting arm means for setting the cutting axis of said cutting means at varying angles relative to a horizontally disposed upper surface of said pipe section.

References Cited

UNITED STATES PATENTS

| | | | |
|---|---|---|---|
| 2,116,083 | 5/1938 | Rusch | 83—54 X |
| 2,326,536 | 8/1943 | Hartsock et al. | 83—183 X |

FOREIGN PATENTS 958,531   5/1964   Great Britain.

JAMES M. MEISTER, *Primary Examiner.*

UNITED STATES PATENT OFFICE
CERTIFICATE OF CORRECTION

Patent No. 3,368,255                    February 13, 1968

Herbert L. Cotton

It is certified that error appears in the above identified patent and that said Letters Patent are hereby corrected as shown below:

In the heading to the printed specification, lines 4 and 5, strike out "Pittsburgh, Pa., a company of Pennsylvania" and insert instead -- a subsidiary of Pittsburgh Coke & Chemical Company, a company of Pennsylvania --.

Signed and sealed this 24th day of June 1969.

(SEAL)
Attest:

Edward M. Fletcher, Jr.                  WILLIAM E. SCHUYLER, JR.

Attesting Officer                        Commissioner of Patents